C. S. JACOB.
DRAWING INSTRUMENT.
APPLICATION FILED DEC. 30, 1918.
1,409,723. Patented Mar. 14, 1922.
Fig. 1.
Fig. 2.
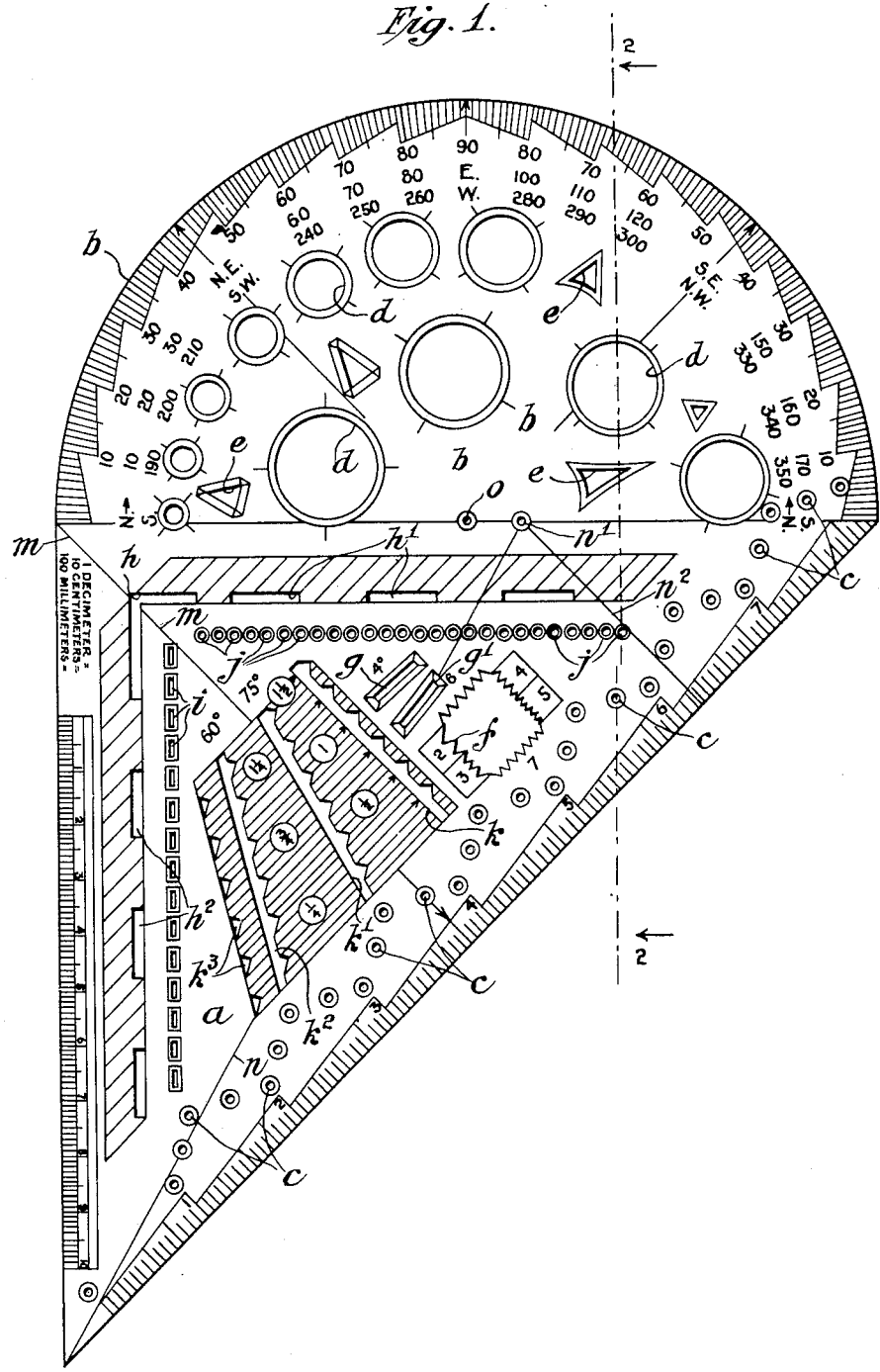
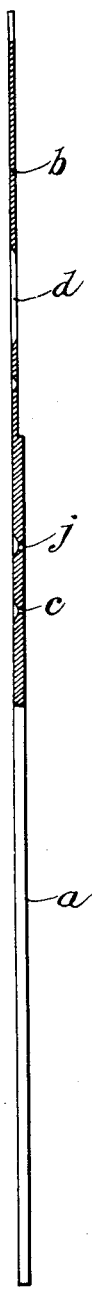
WITNESS
Charles Stanley Jacob INVENTOR
BY Frank P. Wentworth
his ATTORNEY.

UNITED STATES PATENT OFFICE.

CHARLES STANLEY JACOB, OF ELIZABETH, NEW JERSEY.

DRAWING INSTRUMENT.

1,409,723.  Specification of Letters Patent.  Patented Mar. 14, 1922.

Application filed December 30, 1918. Serial No. 268,901.

*To all whom it may concern:*

Be it known that I, CHARLES STANLEY JACOB, a citizen of the United States, residing at Elizabeth, in the county of Union and State of New Jersey, have invented certain new and useful Improvements in Drawing Instruments, of which the following is a specification, reference being had therein to the accompanying drawings, which form a part thereof.

My invention relates to drawing instruments, and more particularly to an instrument for use in making mechanical drawings, which instrument has no movable parts, but is capable of a wide variety of uses alone or in conjunction with an ordinary T-square, in laying out, and penciling in drawings.

A drawing instrument made in accordance with my invention embodies therein a triangle having a 180° protractor at one of the sides thereof, and having various openings through the body of the instrument to facilitate its use as a compass for making circles of various predetermined radii; for determining the circumference of different circles; and for facilitating accuracy in the making of drawings of springs and screws, and of lettering matter and other indicia upon such drawings. I also provide, upon the body of the instrument, lineal markings and graduations which will permit the determination of different angles, or the making of drawings to scale, either by the English or the metric system, the angle markings, and associated openings permitting the instrument to be used to determine different angles, thus incorporating in one instrument the equivalent of a number of different triangles having different angles, or of different sizes. I also provide the body of the instrument with perforations to facilitate the drawing of straight dotted lines, or straight dash lines.

The invention consists primarily in a drawing instrument consisting of a triangular portion having on one side thereof, and formed integrally therewith, a 180° protractor, said protractor being thinner than, but having one surface flush with the surface of said triangular portion, whereby any side of said triangle may be presented to the edge of a T-square, the body of the instrument having openings therethrough to permit the laying out and making of various geometrical figures; and in such other novel features of construction as are hereinafter set forth and described and more particularly pointed out in the claims hereto appended.

Referring to the drawings,

Fig. 1 is a plan view of an instrument embodying my invention; and

Fig. 2 is a section on the line 2—2 of Fig. 1.

Like letters refer to like parts in both of said views.

In the embodiment of my invention shown in the drawings, I have illustrated a form of the invention comprising one portion $a$ in the form of a 90—45° triangle having formed integrally therewith, at one of the sides thereof, a 180° protractor having about the curved edge thereof the usual degree markings and indicia. To permit any side of the triangle to be brought against the straight edge of a T-square, I make the protractor portion $b$ thinner than the portion $a$, so as to bring the undersurface thereof intermediate the surfaces of said portion $a$. In this manner the protractor, when using the triangle, will project across the T-square.

One side of the triangular portion $a$ has graduations formed thereon representing inches and the fractions of an inch, and the body of this portion, adjacent said inch scale, has a sequence of small openings $c$ therethrough arranged a quarter of an inch apart and staggered in relation to each other, as shown, to afford the proper strength of material about each of said openings. One of these openings is at the zero point of the scale and the opening closest thereto is arranged one inch therefrom, thus permitting the instrument to be used as a compass for describing circles or arcs of a predetermined radius from one inch to eight inches in an instrument like that shown in the drawings.

Along another side of the triangular portion I impress graduations in the metric system, such, however, being merely a matter of convenience for taking measurements in the metric system.

Through the body of the protractor $b$ I form a plurality of circular openings $d$ of different diameters for the purpose of drawing small circles, each of said openings having about the periphery thereof, lines arranged 90° apart for the purpose of locating the center of the circle to be described, in a manner to be hereinafter referred to. I also provide openings $e$ through this portion of the instrument, which are substantially triangular in form to permit the drawing of arrowheads of different sizes.

Through the portion $a$, I provide a rectangular opening $f$, the edges of which have differently formed serrations to indicate screw threads of different sizes, to permit exactitude in the drawing of such screws.

This portion of the instrument is also provided with two short openings $g$ and $g'$ arranged at an incline to the hypotenuse of the triangle, for facilitating the drawing of different convolutions of a spring, or different threads of a screw in the proper parallelism and at the right degree of inclination.

To permit the determination of the circumference of any circle, I provide a right angular opening $h$ through the body adjacent and coinciding with the 90° angle of this portion, and two series of openings $h'$—$h^2$, the openings of each series being spaced apart and said series respectively extending parallel with the short sides of the triangle, but at different distances from the apex of the rectangular opening $h$ so as to cause a circle to be exposed through some opening of one set or the other. Impressed upon the body of the portion $a$, adjacent said openings, are gauge lines, the lines adjacent one set $h'$ or $h^2$, being alined with those adjacent the other.

Extending parallel with one of the short sides of the triangle, are a sequence of small oblong openings $i$, to facilitate the making of a dash line, and adjacent the other short side thereof are a sequence of round openings $j$ to facilitate the making of a dotted line.

The body portion $a$ has thereon a sequence of parallel lines, equally spaced apart; and extending through said portion, across said lines, are three openings $k$, $k'$ and $k^2$, the first of which extends at right angles to these lines and the others of which extend obliquely across same at different angles. One edge of each of said openings is straight, while the other edge thereof is notched so that a pencil may be brought opposite any of the parallel lines above referred to, and thus permit the determination of the height of a figure or letter. I also provide a sequence of notches $k^3$ which indicate lines not indicated by the notches of the openings $k$, $k'$ and $k^2$.

In order to permit the location of points indicating triangles of different sizes or having different angles, I provide the surface of the portion $a$ with straight lines dividing the angles of the triangular portion $a$ and extending to opposite edges thereof, or to openings therethrough, to permit the location of points by which different degrees of radiation from a desired center may be determined. One of these lines as $m$, bisects the 90° angle of the triangle $a$ and extends to the edge at the hypotenuse of said triangle. Another line $n$ divides one of the 45° angles and extends to an opening $n'$, a second line $n^2$ leading from this opening to the hypotenuse of this triangle, thus indicating a 90°, 60° and 30° triangle. This line $n^2$ also forms a small 90—45° triangle.

An opening $o$ at the center of the protractor portion $b$ may be used to determine the center of a circle drawn upon the protractor, so that by reversing the instrument and locating this center, a circle may be completed.

The body of the material of the instrument about those openings where accuracy is desirable, is bevelled, as shown, to permit the point of the pencil to be brought sufficiently close to the edge of the opening.

An instrument made in accordance with my invention embodies in an integral structure, characteristics adapting it to the making of a wide range of geometrical figures and for rapidly determining dimensions necessary in the making of mechanical drawings. It does not, however, include irregular curves, or means for determining proportionate dimensions.

The various openings are so arranged that when the instrument is used upon an ordinary T-square, these openings will be brought into the proper relation to the work, and the instrument will be held firmly while the lines are being drawn, or the points indicated. It will be apparent that to secure the desired uses of the structure, the portion $a$ must be capable of having all of its edges brought into engagement with the T-square, so that the step adjacent the point of joinder of the protractor with the portion $a$ must be present.

For use in drawing straight lines at desired angles, any edge of the portion $a$ may be placed against the T-square, according to the angle at which the lines are to extend. If the desired lines do not extend at any angle presented in the portion $a$, different angles may be determined by means of the lines $m$, or the lines $n$—$n^2$, the opening $n'$ indicating the apex of the triangle formed by the last two lines. The protractor $b$ may be used for dividing a circle into arcs of different lengths, thus supplementing the various different triangles indicated in the instrument.

If it be desired to draw a circle, any of the openings $d$ may be used, for circles up to one inch in diameter, or the size of the largest of these openings, accuracy in the drawing of the circle being obtained by the use of lines bisecting each other at right angles at the center of the circle to be drawn, and bringing the 90° markings about the opening $d$ into register with the lines so drawn. If larger circles are to be drawn, any pointed instrument may be inserted through the opening $c$ at the zero point of the scale, and a pencil inserted through any other of the openings $c$, the instrument as a whole then being rotated about the opening through which the pointed instrument is passed. If desired, any of the openings $c$ may be used as the center, instead of the opening at the zero point of the scale, although these openings as a rule will be used only for large circles, of one inch in diameter or greater.

The openings $i$ and $j$ may be used for drawing dash or dotted lines, the accuracy in the drawing of such lines being secured by reason of the fact that said openings extend on a line parallel with the adjacent edge of the portion $a$, which may be engaged with a T-square.

If it be desired to determine the circumference of any circle, the apex of the opening $h$ is brought upon the center of this circle, and the instrument is adjusted so that the perimeter of the circle will appear through some opening in the series $h'$ or $h^2$, and adjacent the corresponding graduation of both series of openings, the different spacing of these openings not only affording the desired strength of material, but ensuring that, within the maximum range afforded by the instrument, the perimeter of the circle will appear through an opening in one of said series, or the other.

The openings $e$ are merely for the purpose of permitting the formation of neat arrowheads of different dimensions.

The openings $g$—$g'$ are for the purpose of permitting accurate indications of the pitch of spring convolutions, or of the threads of screws, the openings $f$ being used to ensure accuracy in the showing of screw threads of different sizes. If the pitch is properly determined as well as the diameter of the screw, the openings $f$ may be used to rapidly complete the drawing of the screw.

The openings $k$, $k'$ and $k^2$ may be used to accurately outline the height and pitch of letters or numbers used upon a drawing, the height being determined by placing the pencil in one of the notches adjacent any of said openings, or in one of the notches $k^3$, a straight line being drawn by moving the instrument along the straight edge of the T-square. The notches of these openings and of the group $k^3$ are so staggered as to permit the location of any height within the range of the parallel lines adjacent said openings. These lines being parallel with the edge of the portion $a$, permits the straight line above referred to, to be drawn.

The straight edge of the portion $k'$ and $k^2$ may be used to draw vertical lines of the letters, or other character, to secure the desired pitch thereof, thus ensuring all letters or characters being of corresponding pitch.

The instrument is preferably made of semi-transparent material, so as to readily expose markings upon the drawing therethrough.

In using the protractor, if it is desired to make a complete circle, or an arc of more than 180°, the instrument may be reversed, and the lines matched to complete the arc or circle.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. A drawing instrument consisting of a triangular portion having on one side thereof, and formed integrally therewith, a 180° protractor, said protractor being thinner than, but having one surface flush with the surface of said triangular portion, whereby any side of said triangle may be presented to the edge of a T-square, the body of the instrument having openings therethrough to permit the laying out, and making, of various geometrical figures.

2. A drawing instrument consisting of a triangular portion having on one side thereof, and formed integrally therewith, a 180° protractor, said protractor being thinner than, and having one surface flush with the surface of said triangular portion, whereby any side of said triangle may be presented to the edge of a T-square, said triangular portion having an opening therethrough at the side thereof adjacent said protractor, and lines thereon extending from said opening to the opposite angle of the triangle, whereby triangles having angles of different degree may be indicated, and the body of the instrument having openings therethrough to permit the laying out, and making, of various geometrical figures.

In witness whereof I have hereunto affixed my signature, this 23d day of December, 1918, in the presence of two subscribing witnesses.

CHARLES STANLEY JACOB.

Witnesses:—
F. T. WENTWORTH,
CLARICE FRANCK.